Figure 1:
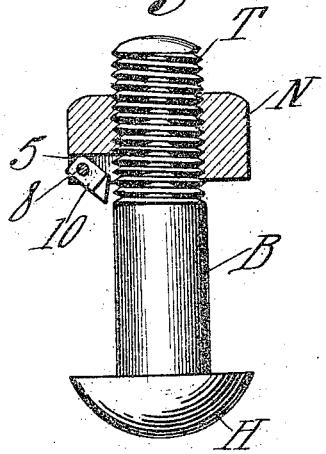

H. B. COX.
NUT LOCK.
APPLICATION FILED DEC. 22, 1910.

1,000,994.

Patented Aug. 22, 1911.

Witnesses

Hugh B. Cox, Inventor
by
Attorneys

UNITED STATES PATENT OFFICE.

HUGH B. COX, OF TEXOLA, OKLAHOMA.

NUT-LOCK.

1,000,994.  Specification of Letters Patent.  Patented Aug. 22, 1911.

Application filed December 22, 1910. Serial No. 598,835.

*To all whom it may concern:*

Be it known that I, HUGH B. COX, a citizen of the United States, residing at Texola, in the county of Beckham and State of Oklahoma, have invented a new and useful Nut-Lock, of which the following is a specification.

This invention relates to nut locks, of that class wherein the nut is connected to the threads of a bolt by a side clutch; and the object of the same is to produce a nut lock of this character in which the clutch will be caused to take into the thread automatically as the nut is screwed home.

To this end the invention consists in the details of construction hereinafter more fully described and claimed, and as shown in the drawings wherein—

Figure 2:
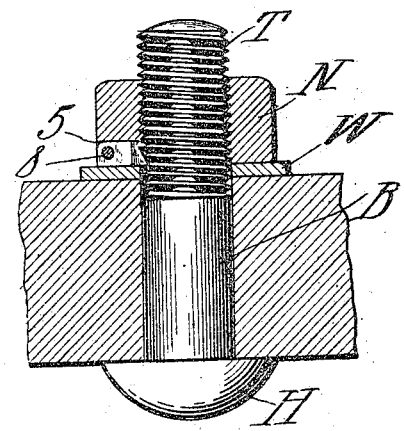
Figure 3:
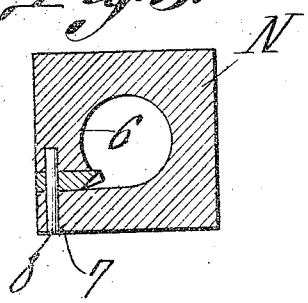
Figure 4:
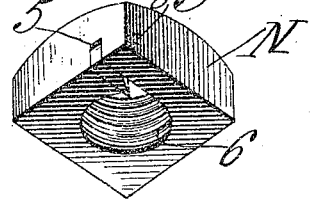
Figure 5:
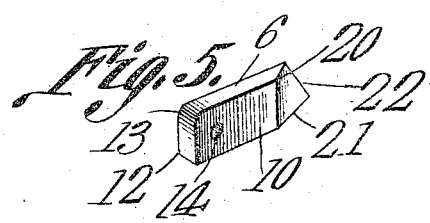

Figure 1 is a central vertical section of a bolt and a nut embodying my invention, showing the nut being screwed idly upon the bolt. Fig. 2 is a similar section showing the nut as being screwed home against a washer. Fig. 3 is a horizontal section through the nut and the recess for the pawl. Fig. 4 is a perspective view of the nut and its pawl. Fig. 5 is an enlarged perspective detail of the pawl alone.

In the drawings, the letter B designates a bolt having a head H and thread T as usual, and N is a nut here shown as square and provided with internal threads engaging those on the bolt, all these parts as well as the washer W shown in Fig. 2 being of no different construction from those in daily use.

Coming now more particularly to my present invention, I cut a recess 5 in one corner of the nut near one edge at a point best seen in Fig. 4, this recess extending tangentially to the nut opening 6 as will be seen in Fig. 3, and in the body of the nut at right angles to said recess I form a hole 7 intersecting the recess as shown. Into this hole is driven or in some way secured a pin 8 upon which is pivotally mounted the pawl best seen in Fig. 5 and which is preferably of chilled steel so that it will be harder than the threads of the bolt.

The pawl is by preference of a size to fit rather closely within the recess 5, for which purpose it has a flattened body 10 with preferably parallel edges and a square rear end 12, and its upper rear corner is preferably rounded off as at 13 around the hole 14 through which the pin 8 passes rather tightly. The purpose is that the pawl shall not move too freely upon its pin, and this is accomplished either by having the pawl fit rather closely within the recess, rather tightly around the pin, or both, or by having its rounded off corner 13 fit rather closely in the top of the recess as seen in Fig. 1. The front or active end of this pawl is beveled off at the upper edge to a slight degree as at 20, and at the lower edge to a greater degree as at 21, so that its extreme front end 22 stands in the plane of its rear wall but oblique to a line across the pawl which would be parallel with its rear end 12. The inclination of the front end 22 is such that when the pawl is tipped down around its pivot as seen in Fig. 1 said edge will pass entirely out of contact with the raised threads upon the bolt, and it is my preference that the pawl shall not swing out of the recess in the nut farther than as shown in this view.

In use the parts are assembled and the nut screwed home. As its inner face comes against the washer, the projecting inner end of the pawl is lifted so that its body is turned around its pivot, and this action causes its sharp oblique front end 22 to cut through one or two of the threads on the bolt so that finally the parts come to rest as shown in Fig. 2 and it is then impossible to turn the nut any farther. It is my intention that the bevel of the front end 22 shall be such that as the pawl is being swung into its position shown in Fig. 2 the upper or more retracted portion of the end 22 will pass by the threads on the bolt until the pawl has been almost completely housed, which leaves the front end 22 to make reliable connection with the thread just at the time when the nut is screwed home.

What is claimed as new is:—

1. A nut lock comprising a nut having a recess tangential to its thread-aperture and opening through one face of the nut, the latter also having a hole intersecting the outer end of said recess at right angles thereto; combined with a pawl having a transverse hole through its body near its outer end, its inner end being beveled off at different angles at its upper and lower edges so that its sharp extremity shall stand oblique to a transverse plane through its body, and a pin fixed in said hole in the nut and pivotally engaging that in the pawl with some friction.

2. A nut lock comprising a nut having a recess tangential to its thread-aperture and opening through one face of the nut, the latter also having a hole intersecting the outer end of said recess at right angles thereto: combined with a pawl fitting snugly within said recess and having a transverse hole through its body near its outer end, its outer corner being rounded so as to stand in frictional contact with the bottom of said recess and its inner end being beveled off at different angles at its upper and lower edges so that its sharp extremity shall stand oblique to a transverse plane through its body, and a pin fixed in said hole in the nut and pivotally engaging that in the pawl.

In testimony that I claim the foregoing as my own, I have hereto affixed my signature in the presence of two witnesses.

HUGH B. COX.

Witnesses:
F. B. OCHSENREITER.
N. L. COLLAMER.